M. C. CLARK.
RUBBER FOOTWEAR.
APPLICATION FILED APR. 20, 1909.
985,780.
Patented Mar. 7, 1911.
2 SHEETS—SHEET 1.
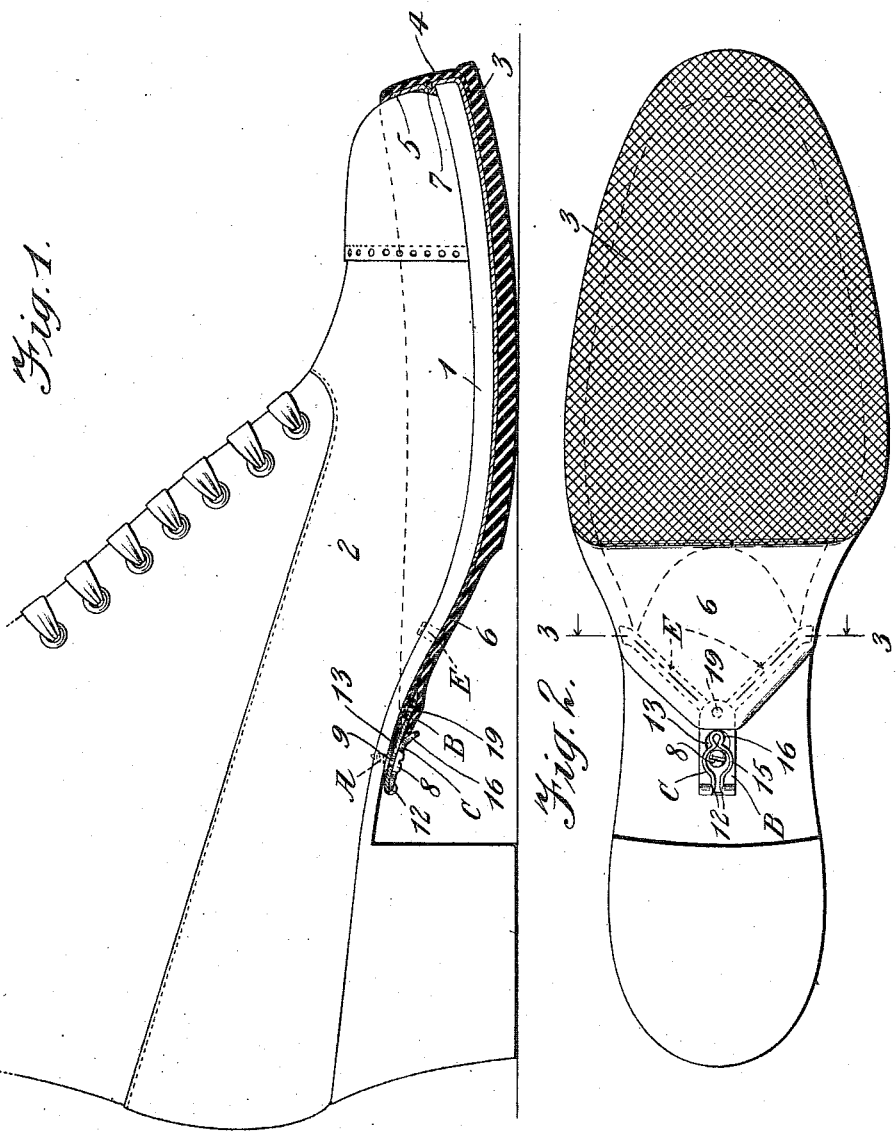

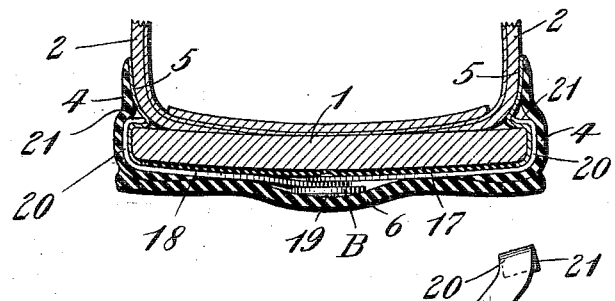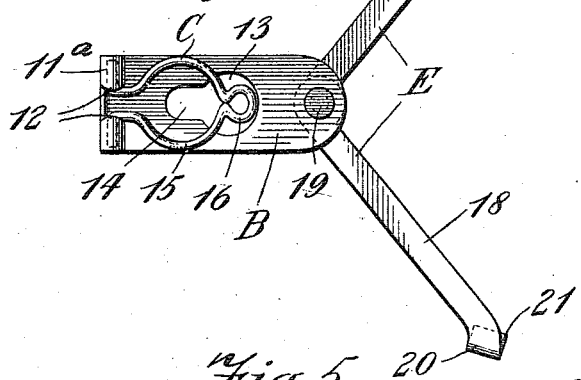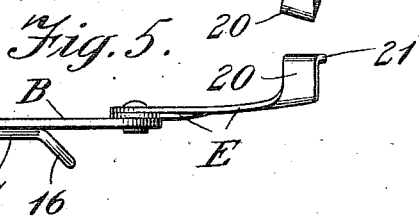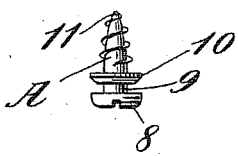

UNITED STATES PATENT OFFICE.

MAURICE C. CLARK, OF PROVIDENCE, RHODE ISLAND.

RUBBER FOOTWEAR.

985,780. Specification of Letters Patent. Patented Mar. 7, 1911.

Application filed April 20, 1909. Serial No. 491,143.

*To all whom it may concern:*

Be it known that I, MAURICE C. CLARK, a citizen of the United States, and a resident of Providence, county of Providence, and State of Rhode Island, have invented a new and useful Improvement in Rubber Footwear, of which the following is a specification.

This invention consists in a modification of the improvement which is the subject of my application Serial No. 435,408, filed May 28, 1908.

In the accompanying drawings, Figure 1 is a side view of a leather shoe with a sectional view of one of my improved overshoes or rubbers attached. Fig. 2 is a bottom view of the same. Fig. 3 is a cross section on the line 3, 3, of Fig. 2. Figs. 4, 5 and 6 are details of the fastening device.

1 is the outsole of the leather shoe. 2, the upper thereof.

3 is the outsole of the rubber; 4, the upper thereof, and 5 the lining thereof.

6 is a shank of elastic rubber extending rearwardly from the outsole 3 and connected with the upper 4, the top edge of which is indicated by the dotted line in Fig. 1. There may be a cord 7 between the upper and the lining to produce a projection above the sole 1 extending around to the shank on both sides.

It remains to provide a fastening for the rear end of the shank and this fastening, as shown in the drawings, consists of a stud portion A and a fastener portion B, C, E. The stud portion consists of a head 8, neck 9, base plate 10 and screw point 11.

The portions B, C, of the fastener are particularly described in my application Serial No. 490,032, filed April 15, 1909. The portion B is of sheet metal turned over at one end to form a hinge for the portion C which is preferably of spring wire and is caused to snap open and snap shut by the rounded projections 12 at the hinge 11ª. The sheet metal portion B contains the opening 13 slightly larger than the stud head, and the slotted extension 14 slightly smaller than the stud head, but slightly larger than the neck. The slotted extension 14 is preferably so proportioned that a circle drawn within it will be substantially tangent to the circle of the opening 13. The fastener member C is preferably of the double loop form 15, 16, shown. When closed, the loop 15 encircles the slotted extension 14 and therefore acts as a stop to prevent the escape of the stud from the slot. The loop 16 is inclined at an angle of about 45° and therefore facilities the opening of the socket.

The clamping portion E is substantially a pair of tongs composed of the two members 17, 18, pivoted to the plate B at 19. At its extremity, each member of the tongs contains the bends 20 and 21 enabling it to engage with the leather sole 1, as shown in Fig. 3.

When the fastener is strained rearwardly by engagement with the stud, it not merely stretches the elastic shank 6, but tends to close the tongs E and cause the extremities thereof to firmly clamp the sole 1 at about the position shown in Fig. 1.

When combined with the rubber shank, the tongs and a portion of the plate B are embedded between the lining 5 on the inside and the upper 4 and shank 6 on the outside. The stud is screwed into the shank of the leather shoe, as shown in Fig. 1. Having placed the overshoe on the sole, the fastener with the loop C open is pulled backward until the stud head passes through the opening 13. Then as the socket is released, the stud passes into the slotted extension 14. Then the loop C is closed, as shown in Figs. 1, 2, 4 and 5, and so long as it stays closed it acts as a stop to prevent the escape of the stud from the slotted extension 14. When held in this position, the fastener acting through the elastic shank 6 and the tongs E holds the sides of the overshoe firmly and closely in contact with the leather shoe.

Having thus described my invention, what I claim is:

1. An article of rubber footwear having a longitudinally elastic shank, but devoid of a heel, sole-clamping tongs embedded in the shank portion, and a fastener adapted to coöperate with a projection on a shoe and be held in engagement with said projection by the elasticity of the shank connected to the tongs at their pivotal connection and acting against the tension of said shank to engage the tongs with the shoe sole.

2. An article of rubber footwear having a longitudinally elastic shank, but devoid of a heel, tongs embedded in the shank, the free ends of the tongs terminating adjacent the edges of the shank and provided with sole-engaging means, and a fastener connected to the tongs at their pivotal connection and adapted to act against the tension of said shank to operate the tongs to place them in engagement with the sole.

3. An article of rubber footwear having a longitudinally elastic shank, but devoid of a heel, tongs embedded in the shank, the free ends of the tongs terminating adjacent the edges of the shank and provided with sole-engaging hooks embedded within the shank, and a fastener connected to the tongs at their pivotal connection and adapted to act against the tension of the shank to operate the tongs to place them in engagement with the sole.

4. An article of rubber footwear, having a longitudinally elastic shank, but devoid of a heel, sole-clamping tongs embedded in the shank portion, and means connected to the tongs at their pivotal connection for exerting a pull thereon against the tension of the shank to place them in engagement with the sole of a shoe.

In testimony whereof, I have hereunto signed my name in the presence of two subscribing witnesses.

MAURICE C. CLARK.

Witnesses:
LOUIS J. BERNSTEIN,
W. A. PAULING.

Copies of this patent may be obtained for five cents each, by addressing the "Commissioner of Patents, Washington, D. C."